United States Patent [19]

Collard

[11] 4,239,976
[45] Dec. 16, 1980

[54] FLOATING ELECTRIC GENERATOR USING THE DRIVING ENERGY OF WATER

[76] Inventor: Louis-Jean Collard, 16 Avenue Anatole France, 63130 Royat-Puy-De-Dome, France

[21] Appl. No.: 891,227

[22] Filed: Mar. 29, 1978

[30] Foreign Application Priority Data

Mar. 29, 1977 [FR] France .............................. 77 10332
Feb. 21, 1978 [FR] France .............................. 78 05781

[51] Int. Cl.³ .............................................. F03B 13/00
[52] U.S. Cl. ......................................... 290/42; 290/53
[58] Field of Search ...................... 290/42, 43, 53, 54

[56] References Cited

U.S. PATENT DOCUMENTS

| 2,097,286 | 10/1937 | McGee | 290/54 |
| 2,730,631 | 1/1956 | Dandini | 290/54 |
| 3,209,156 | 9/1965 | Struble | 290/54 |
| 3,671,756 | 6/1972 | Meier | 290/54 |
| 3,928,771 | 12/1975 | Straumsnes | 290/54 X |
| 4,104,536 | 8/1978 | Gutsfeld | 290/54 |

*Primary Examiner*—Gene Z. Rubinson
*Assistant Examiner*—W. E. Duncanson, Jr.
*Attorney, Agent, or Firm*—Eric P. Schellin

[57] ABSTRACT

Electric power is produced from flow of water by means of a floating rotor, journalled on a non-rotating shaft, which is moored in place. The rotor is turned by peripheral vanes, which engage the flow. Inside the rotor are mounted energy conversion means which change the energy of rotation into electric or hydraulic power, delivered to a distribution system through the non-rotating shaft.

21 Claims, 19 Drawing Figures

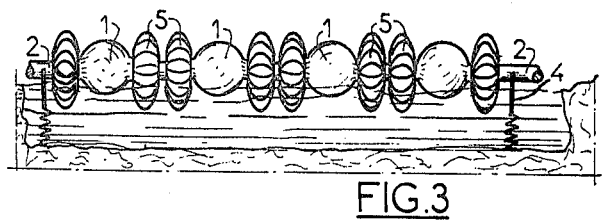
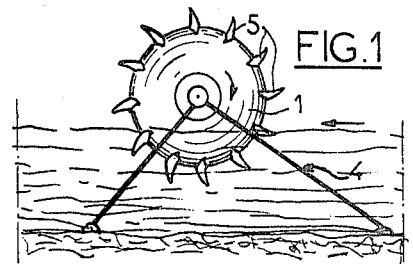
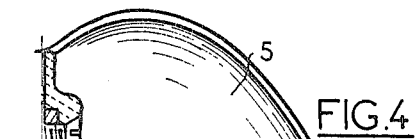
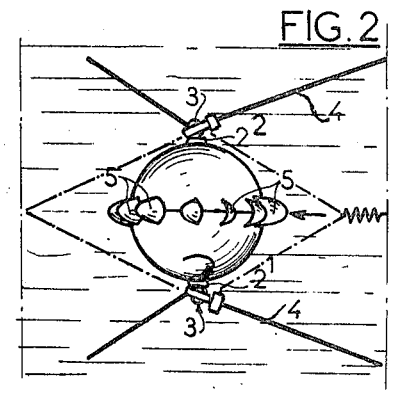
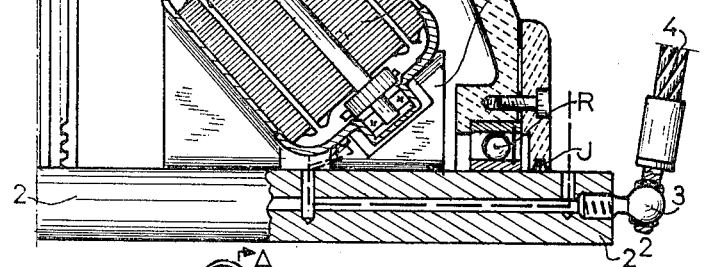
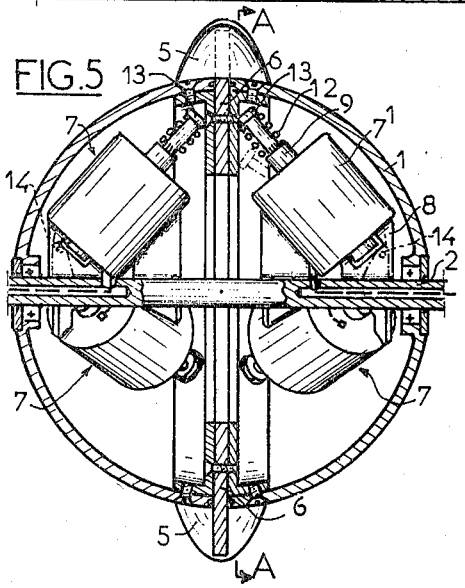
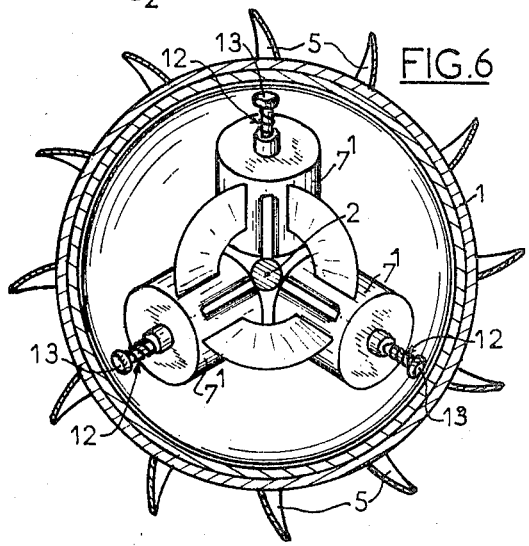

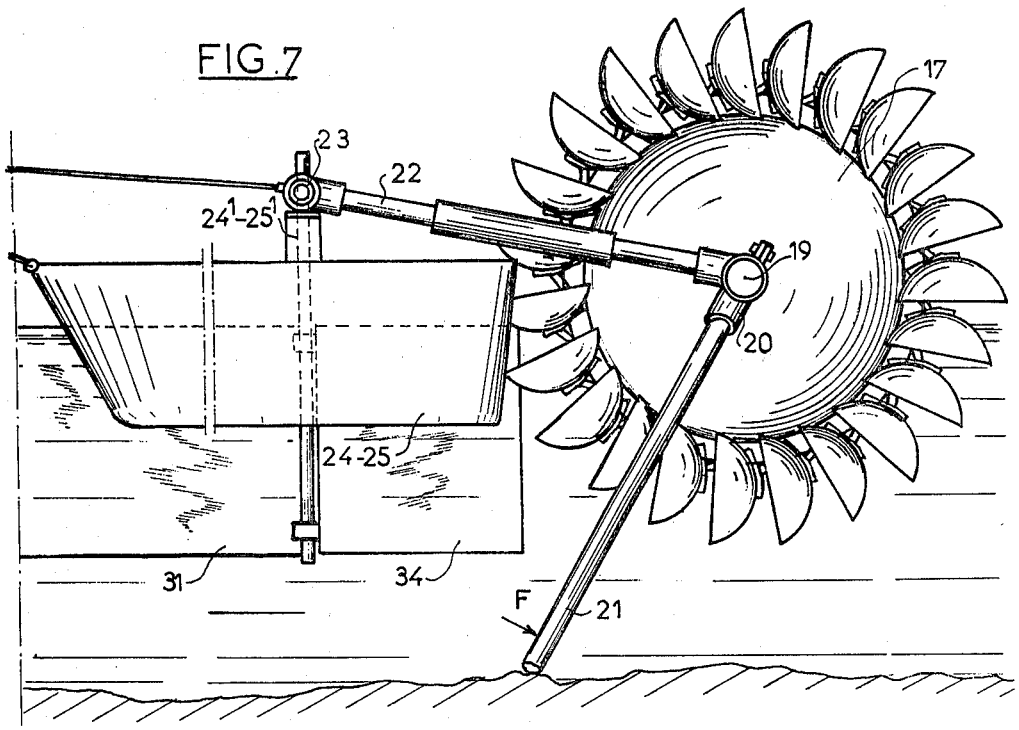
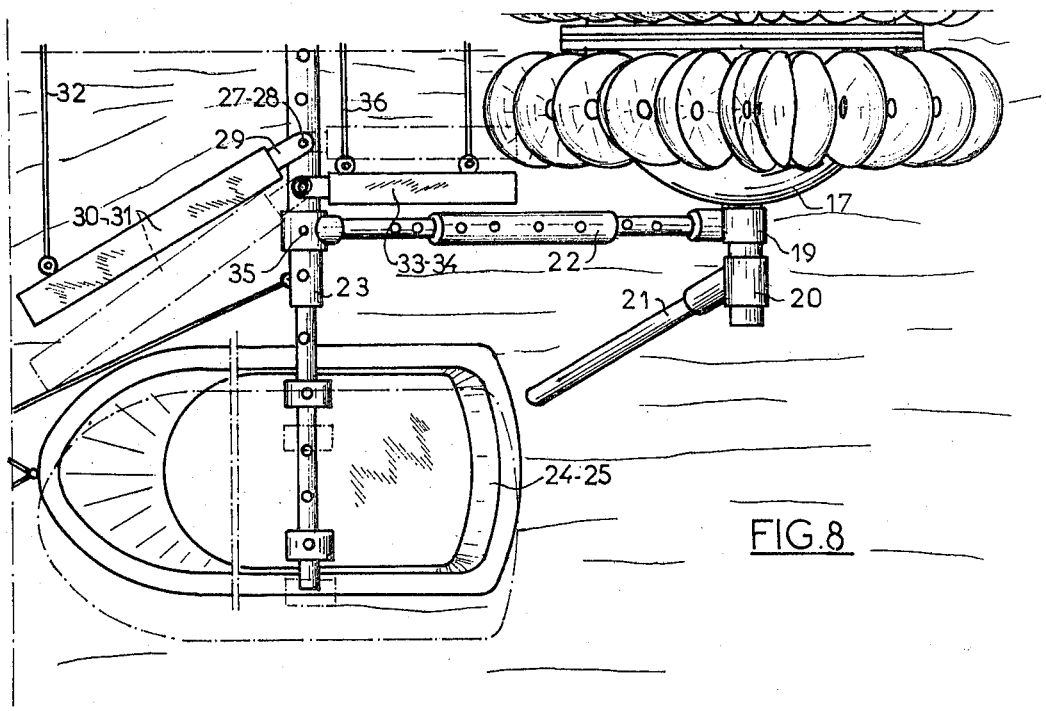

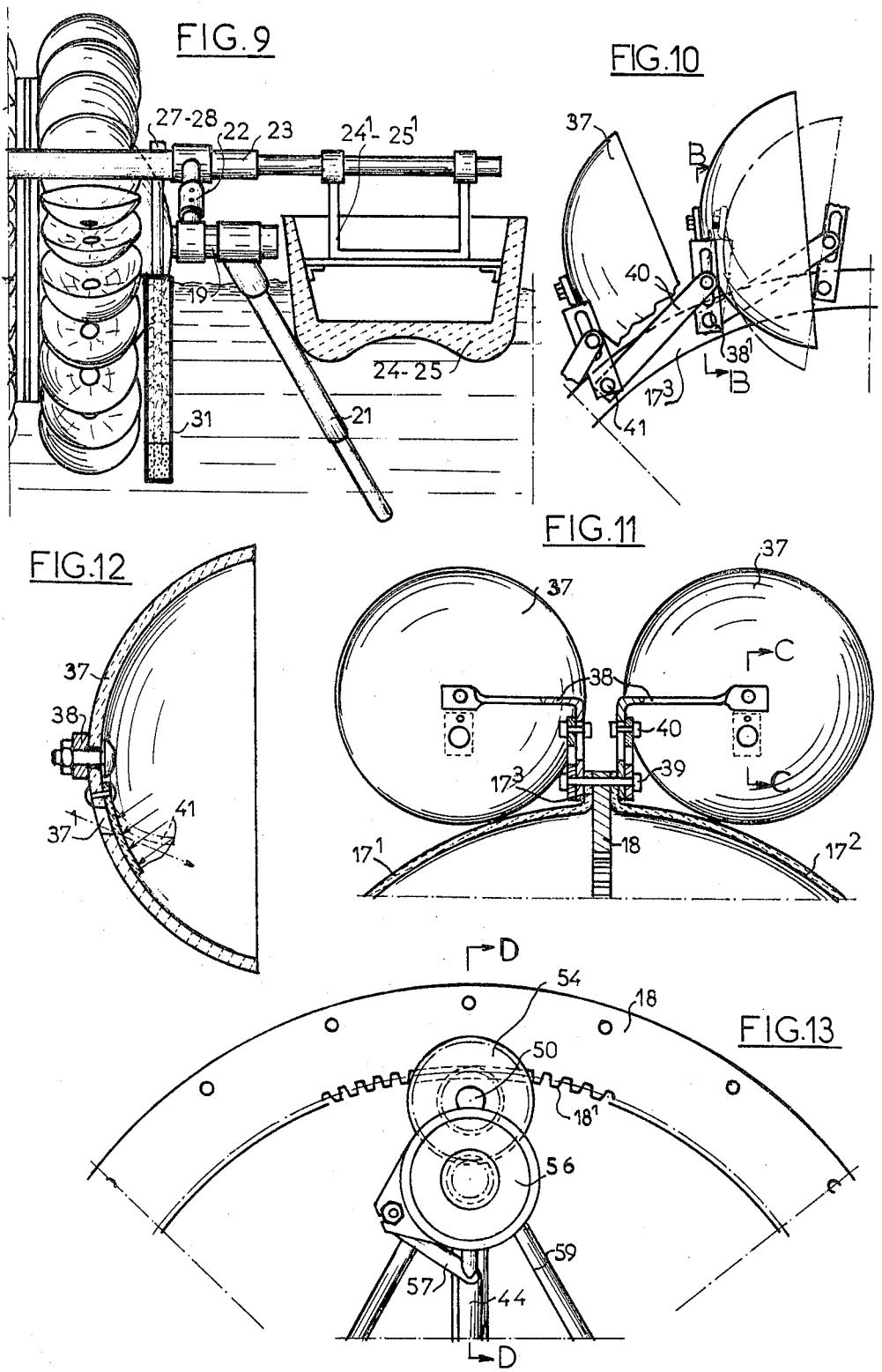

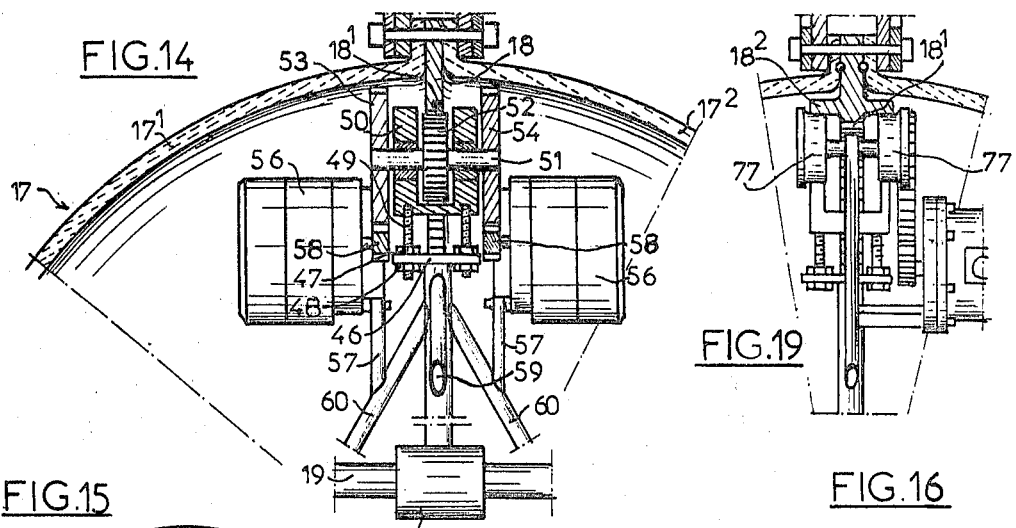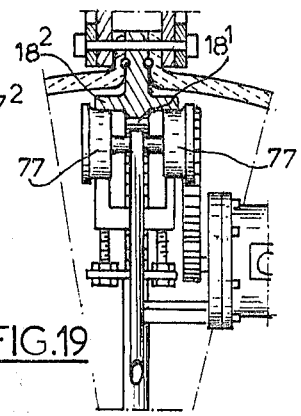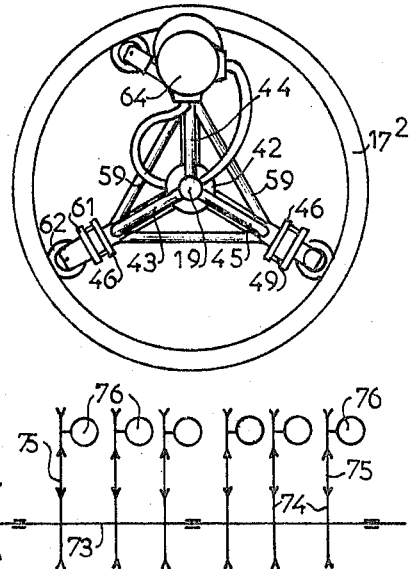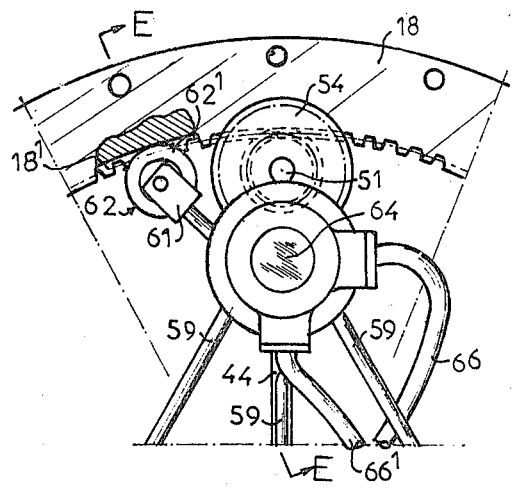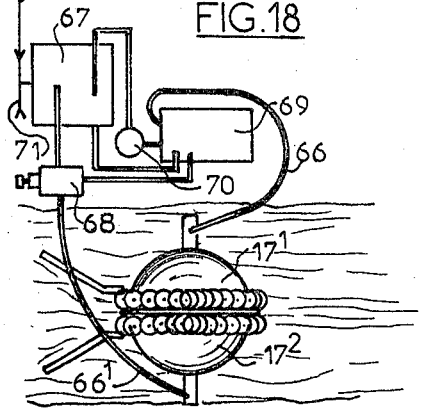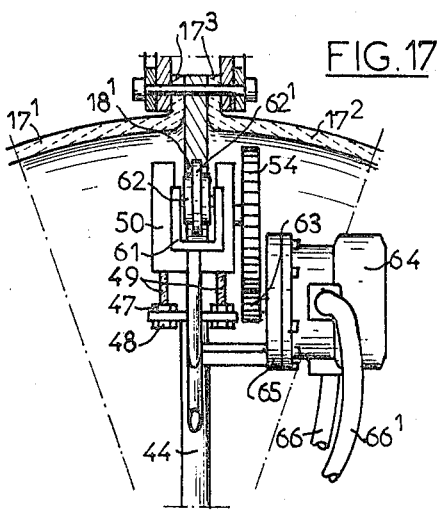

FLOATING ELECTRIC GENERATOR USING THE DRIVING ENERGY OF WATER

This invention relates to the production of electric power and to the dynamo-electric machines.

Electric power is produced to-day jointly with another form of energy, the transformation taking place in factories that are commonly called "central power plants".

The energy used for this transformation is either the energy from the combustion of certain materials, or the energy resulting from the fall of a large body of water, or finally some other forms of energy such as tidal or wind energy, and accordingly the plant is called: thermal, hydraulic, tide-driven or wind-driven.

In addition to the high cost of the fuels and of their shipment, large and expensive installations are needed for the transformation; and in the case of tidal or wind energy, the efficiency of the plants is low.

Finally, it will be noted that in any case, the electric power is produced from a rotary motion of a turbine or dynamo shaft, or other apparatus with a rotation speed that is necessarily low.

Therefore, to eliminate these disadvantages, it has been thought necessary to provide an electric power generator formed by a floating self-contained unit, and driven by the movement of the water. Such a generator is the general object of the present invention.

According to a first characteristic, this electric power generator is made from a hollow volumetric solid body of any section, and preferably rotating, the size of which body permitting the buoyancy thereof with the natural stream of a river, torrent or any other natural or artificial water flow, with a varying or unvarying regime, or water falls, said floating volumetric solid body being mounted for free rotation around a projecting fixed shaft the ends of which are snugly and adjustably connected to a mooring station to enable thereby said solid body, by means of blades or paddles disposed axially or angularly to the outside periphery thereof, to be driven at high speed by the energy produced by the stream of water; electric generators disposed at right angle or in star arrangement according to all directions within the volumetric solid body being mechanically connected by means of their stators to the stationary shaft while their rotors are driven at high rotation speed through friction or gear devices by the inside or outside periphery of the larger diameter to provide thus the operation at the same time of all the generators for producing electric power to be collected by output electrical leads.

According to a further characteristic, the driving means for the rotors is provided by heads that are mounted on the end of a spindle integral with each rotor to work by frictional, meshing or other engagement on each face of a flange that connects diametrally the inside of each volumetric solid body and in the direction of the larger diameter thereof to provide a multiple speed drive.

According to a further characteristic, an angular swivelling of each generator is permitted by the fastening of the stators to the stationary shaft, so that the driving diameter of the heads of each flange face may be varied, in order to vary the driving speed of the rotors.

According to a further characteristic, the fixed or stationary shaft protruding from one or a plurality of generators mounted separately or interconnected is connected at the ends thereof to a mooring station by means of cables, ropes, or even a framework. In case of moorings, these can be diverging or converging in relation to the ends of said shaft, and they are of necessity disposed upstream in order to hold back the system. These moorings, generally with compensating means for their resilient shifting in case of shock are preferable connected electrically to an alarm system the triggering of which is ensured in the event of unforeseen inpact with a floating vehicle such as a boat, or also in the event of breaking.

Other moorings, preferably stationary and located downstream, can also be mounted converging or diverging and electrically connected to the alarm system.

According to a further characteristic, in an alternative form of the invention, the horizontal stationary shaft of the hollow solid body has projecting ends that are coupled to lever arms disposed upstream to bear automatically by their free ends when the shell is rotated on the bottom of the river or possibly on any other floating or immersed fixed part, said shaft being combined or not with a canalization device, in order to provide the immobilization thereof in rotation regardless of the moorings or not.

According to a further characteristic, the horizontal stationary shaft is integral with telescopic arms disposed forwardly of the shell and coupled fixedly or not to a raised transverse bar connecting and coupling adjustably in relation to the shell two floats or boats berthed and symmetrically spaced apart for receiving axially the inlet and canalization device that forms a water neck-injector opposite to the blades of the shell.

According to a further characteristic, the horizontal shaft is immobilized by the bottom of the watercourse and/or by the floats or boats, while the mooring is also provided by the bottom of said watercourse and/or on the bank. These fastenings can be intercombined.

According to a further characteristic, the transverse bar is provided with openings for the interengagement of vertical pins that form positioning and securing spindles for the end of opposing vertical coffers conveniently disposed for the sole purpose to form like a venturi the water neck-injector located opposite to the blades of the shell.

According to a further characteristic, the vertical coffers are angularly adjustable forwardly of the transverse bar while being interbraced or interlocked to constitute an axial triangulation forming the injector, while their rear parts, that can be built up or integral, are disposed symmetrically and parallel opposite to the blades and along the axis of the shell, and form the distributing channel for the rotary drive.

According to a further characteristic, one or more rows of blades or paddles disposed in the direction of water flow in circular arrangement and respectively formed by hemispheric bowls or other sections, are received by the shell peripherally and axially on either side of the assembly plane of the half-parts thereof.

According to a further characteristic, each bowl of reinforced plastics is made externally integral at the central part thereof with a squared arm hingedly fixed on collars of the shell, while a second rectilinear arm fixed endwise to the fastening point of the next bowl forms an abutment while cooperating at its end with a slot in said squared arm for the adjustment in tangential position of said bowl on the periphery of the shell.

According to a further characteristic, each bowl is provided internally with a slide valve cooperating with an opening in order to close same when the shell is driven in rotation while being collapsed on emergence of the water under the effect of air pressure so as to prevent a suction effect braking the rotation.

According to a further characteristic, the horizontal stationary shaft is made integral within the shell in the plane of a toothed rim with a support ring having disposed thereon radial and symmetrical arms provided at the ends thereof with plates for mounting by means of lengthwise adjustable rods a block that can be a speed multiplier or not with a central toothed gear meshing with the toothed rim and two opposing wheels of larger diameter cooperating respectively with an electric generator and driven or not by the speed gearing device.

According to a further characteristic, the electric generators, such as alternators, are arranged in a pair along each arm on either side of the toothed rim while being gear driven simultaneously by means of the opposing wheels of the speed gearing device.

According to a further characteristic, the radial arms are interconnected along their common plane by spacers forming a triangulation, and transversely by braces fixed symmetrically on the stationary shaft.

According to a further characteristic, in an alternative form of the invention, an adjustable mounting is permitted endwise by the arms, respectively, for a roller-holder support or framework lined or not with a soft material to cooperate with a median groove formed in the thickness of the toothed rim or possibly of the opposite spans of the latter in order to provide the centering and positioning thereof without bearing stress on the teeth; one or all of the arms receiving the blocks that can be speed multipliers or not being driven by the teeth of the rim the wheel or the opposing wheels of which cooperate with the pinion of a hydraulic pump the fluid inlet or outlet hoses of which pass through the inside of the stationary shaft in order to be connected to a hydraulic engine on the bank, said motor driving by means of its flywheel either an assembly of electric generators or any apparatus or machine, and forming thereby a power take-off.

According to a further characteristic, in an alternative form of the invention, the shell comprises at least two symmetrically disposed wheels that are coupled to the extreme hemispheres and connected by a sectional sleeve ensuring the continuity and providing inside the housing of one or more electric generators or hydraulic motor with the reservoir thereof and driven by said toothed rims or cam rims.

According to a further characteristic, in an alternative form of the invention, the spindle of the shell is provided with pales for the driving in rotation of said shell, in order to drive the generators or motor, while the shell is made stationary.

According to a further characteristic, in an alternative form of the invention, one or more pumps the suction pipe of which draws directly from the water along a side of the hollow stationary shaft while the delivery pipe opens along the opposite side, are received inside the spherical or elongated shell by means of the intermediate sleeve; with this equipment, a drinking water supply can be provided by means of a reservoir, or a continuous irrigation without the cost of civil engineering.

Other objects and advantages will be apparent from the following specification, read in connection but not limitatively with the accompanying drawings, in which:

FIG. 1 is a schematic view of a floating electric power generator, using the driving energy of water, immerssed in part and berthed in a watercourse;

FIG. 2 is an external perspective view corresponding to FIG. 1. The dotted lines illustrate converging moorings;

FIG. 3 is a side view illustrating the mounting of a plurality of volumes rotating on the same fixed and moored shaft;

FIG. 4 is a fragmentary sectional view on a larger scale of an electric generator in the case of driving by toothed rim of each rotor;

FIG. 5 is a general diametral section view, on a reduced scale, of a floating electric generator, in the case of frictional drive of each rotor;

FIG. 6 is a cross-sectional side view along A—A in FIG. 5, the electric generators being shown externally;

FIG. 7 is on a smaller scale a front view of the floating generator, equipped with the mooring device of the stationary shaft together with an artificial canalization of the watercourse in regard to the blades of the shell;

FIG. 8 is an external perspective half-view corresponding to FIG. 7;

FIG. 9 is an upstream side half-view, corresponding to FIG. 7;

FIG. 10 is on a large scale a front and detail view illustrating the adjustable fastening of the bowl-shaped blades on the diametral collars of the shell;

FIG. 11 is a transverse sectional side view along B—B in FIG. 10;

FIG. 12 is on a larger scale a lengthwise sectional side view along C—C in FIG. 11;

FIG. 13 is a diametral section view in part, illustrating the mounting and the drive of the electric generators fixed in pairs at the end of each radial arm;

FIG. 14 is a cross-sectional side view along D—D in FIG. 13;

FIG. 15 is on a small scale a diametral sectional view illustrating the mounting of the generator assembly in relation to the toothed rim integral with the shell;

FIG. 16 is a fragmentary sectional diametral view illustrating the mounting and the drive of a hydraulic pump mounted at the end of a radial arm, according to an alternative embodiment of the invention;

FIG. 17 is a sectional side view along E—E in FIG. 16;

FIG. 18 is a merely schematic view illustrating the mechanical drive of a plurality of alternators disposed on the bank by means of one or more hydraulic pumps located within the shell and driven by same:

FIG. 19 is a cross-sectional side view of an embodiment illustrating the double guiding and centering by rollers in relation to the toothed rim.

In order to make it more concrete, the object of the invention will be described now in an embodiment, without being limited to same.

The floating electric power generator using water energy includes mainly a hollow external volume or shell 1 made of any convenient material and in any form, preferably a rotary form such as a sphere, the size of this shell allowing for the buoyancy thereof including the generator organs located within the hollow part of the shell or possibly on the external side thereof.

This external shell 1 comprised of several assembled elements is mounted for free rotation by means of ball bearings or the like R and of suitable joints J on a diametral shaft 2 the projecting ends $2^1$–$2^2$ of which are provided with hinged means such as ball and socket heads 3 for the fastening of converging or diverging mooring cables or ropes 4 disposed upstream or downstream and tensioned elastically by means of springs or the like and that can be laid in any direction. The opposite ends of these moorings 4 can be secured either at the bottom of the watercourse, or on the bank by any known means such as berthing station or bedding in a concrete foundation block or any dead body. In case of shock or breaking, the intervention of a safety service is provided by the triggering of a safety device connected electrically to these moorings 4.

Blades or paddles 5, for instance in the form of fixed or built up volumes, arranged according to the direction of rotation around shaft 2, are formed externally the shell 1 on the periphery thereof.

These pales 5 can be mounted externally and symmetrior angularly to the larger diameter of the periphery of the shell 1, or directly around the projecting portions of the shaft 2 as may be seen from FIG. 3, while being integral with said shell 1 in order to increase the rotation speed of the latter.

This shell 1, defined externally as above, forms a self-contained volume for buoyancy with the stream of a natural or artificial watercourse such as a river, an estuary, a torrent or at the seaside also, in order to use the ebb and flow according to a vertically adjustable level, by means of flexible moorings making it possible to lift off or to immerse said shell in accordance with the whims of the water; the energy produced by the stream of water actuating the blades 5 for the rotational movement of the shell 1 around the shaft 2 that remains stationary.

The inside of shell 1 forms a cavity $1^1$ that has preferably the same shape as the outside of the shell and is widely oversized for the housing of a plurality of electric generators, dynamos, alternators, and for the rotational drive of their rotor.

For this purpose, a flange 6 of one or more elements, that is preferably disposed normal to shaft 2 and driven rotatingly in a circle owing to its external periphery being integral with shell 1, is received axially and internally within the cavity $1^1$ of said shell 1.

The electric generators 7 are disposed concentrically and angularly either in one or several diametral planes passing through shaft 2, as may be seen from FIG. 4, or in star arrangement, as shown FIG. 5 and 6, or according to any other symmetrical or non symmetrical arrangement, and are made respectively with a stationary part $7^1$ forming the stator that is directly connected to the shaft 2 by means of lugs 8 or the like, the rotor $7^2$ of these generators being driven in rotation by the spindle 9 thereof. This spindle 9 is extended externally by a head 10 coupled to a spindle 11 that can be shifted axially and is returned to the external projectiong position by an elastic means such as a coil spring 12, elastic rings or other equivalent means.

This spindle 11 receives at the end thereof a sectional head 13 engaging frictionally the corresponding face of flange 6 along a determined diameter so as to make possible upon rotation of the shell 1 the rotational drive of the spindle 9 and thereby of the rotor $7^2$ in accordance with a high speed ratio.

As an alternative, the drive speed ratio and the flexibility of the spindle 11 rigidly locked with the rotor $7^2$ can be modified as shown in FIG. 5 by mounting the fastening lug 8 of the stator $7^1$ hingedly around a shaft 14 driven by shaft 2. In this way, the entire dynamo or alternator unit is capable of being pivoted angularly around the shaft 14 in order to engage the sectional head 13 frictionally with flange 6 according to a driving circle of varying diameter to allow for a speed decrease.

According to the embodiment of FIG. 4, the shell 1 receives internally within its cavity $1^1$ a circular rim 15 the faces of which are toothed as at $15^1$ for meshing with the corresponding toothed heads 16 mounted at the end of driving spindles 11 of the corresponding rotors $7^2$.

The electrical connection of the dynamos or alternators is provided by connection wires or bars, that are conveniently insulated and placed within the shaft 2 and the moorings or by wires emerging from the water level at any head of the latter.

It will be evident that such an electric power generator of any suitable efficiency and size can be immersed in part in torrents, water falls, rivers, estuaries or at the seaside with flexible expansion moorings making it possible to follow the ebb and tide, without excluding however rigid moorings in the form of framework. Note also the possibility of mounting on the same stationary shaft a plurality of shells 1 driven separately or simultaneously by reason of their coupling.

According to a further embodiment, the floating electric power generator includes an external volume or hollow sphere 17 of any suitable material, more particularly of plastics. This sphere is conveniently comprised of two hemispheres $17^1$ and $17^2$ to be assembled diametrally by means of their collars $17^3$ and of suitable joints on either side of the axial toothed rim 18.

This sphere 17 receives internally the electric power generator organs as set forth hereafter, and is mounted for free rotation, by means of ball bearings or the like, on a fixed shaft 19 disposed normal to the plane formed by the toothed rim 18 integral with the sphere 17 and protruding at the ends thereof.

Said protruding ends of this shaft 19 permit the rigid fastening by collars 20 or the like of arms 21 that are preferably tubular and disposed normal to and forwardly of sphere 17. These arms 21 are provided at their ends with floats and are assembled when the sphere 17 is placed in the water, the stream causing said arms to drive in rotation said sphere 17 and thus practically the shaft 19 thereof and to be automatically pivoted in the direction of arrow F in the FIG. 7 up to a backing position of the ends of said arms on the bottom of the watercourse or any other immersed or floating fixed point. It must be considered that the simple or telescopic arms 21, owing to the depth of the watercourse, make it possible thereby to secure in rotation the shaft 19 irrespective of the moorings for preventing the drift.

It must be also considered that the protruding ends of the stationary shaft 19 make it possible to fasten by means of collars or the like drag bars 22 that are symmetrically disposed and adjustable lengthwise with the help of sleeves or other means. These drag bars 22 are coupled adjustably, and forwardly in relation to the sphere 17, to a transverse bar 23 the length of which is also adjustable and connecting in the way of a small bridge two boats 24 and 25 or floats of any other type that are substantially and symmetrically spaced apart in the axis of said sphere 17.

It will be noted that the drag bars 22 fastened by means of collars or the like to shaft 19 can be substituted for the arms 21 provided to secure in rotation said shaft 19.

These boats 24 and 25 are conveniently made with an inside framework 24[1] and 25[1] respectively, and form a supporting cradle for the transverse bar 23; of course, they are preferably moored to the bank, and form thus a detachable assembly with the sphere 17 and the arms 21 while upholding a removable coffer device forming a stream injector-neck right ahead of the spaced rows of blades of the sphere 17.

For this purpose, the transverse bar 23 permits symmetrically by the openings thereof the engagement of upright pins 27-28 that form pivot studs for hinges 29 mounted endwise of two vertical coffers 30-31 immersed in the water and disposed in triangulation to provide a throttling or venturi in line with the immersed blades, increasing thereby the flow of water and thus the rotation speed of the sphere 17. It will be observed that these coffers 30 and 31 are preferably of wood and are weighed internally at the bottom thereof by any material such as sand, with a material for their buoyancy in the top parts, while being rigidly interconnected by links 32.

At the side opposite, the throttling formed by the coffers 30 and 31 is conveniently extended by an inlet canal disposed axially in relation to the rows of immersed blades of the sphere 17, and formed also by further coffers 33-34 coupled at the side opposite to the transverse bar 23 by means of pins 35, or by means of hinges as the case may be. These coffers 33-34 are braced by transverse rods or by interlocking.

With this arrangement, there is provided an assembly for quick mounting that can be easily brought and shifted on a watercourse right ahead of the more optimal stream.

The blades of the sphere 17 are arranged in one, two or more symmetrically spaced rows and are made from a plurality of hemispheric bowls 37 or of any other section such as a parabolic section, forming a receptacle of circular or non circular section, disposed circularly and peripherally.

Each bowl 37, made preferably of reinforced plastics, is made axially associated or not by means of bolts or the like with a squared support arm 38 disposed externally the vertical leg 38[1] of which extends in the plane of the collar 17[3] of the corresponding hemisphere of the sphere 17 to be adjustably fastened by bolt 39. The latter extends successively through the thickness of the collars of the hemispheres 17[1] and 17[2] as well as through the thickness of the toothed rim 18, in order to provide the coupling in pair of two or more bowls 37 spaced apart transversely.

It will be noted here that when the bowls are not axially fastened, the adjustment is more accurate while having the possibility to mount the same bowls in different positions.

It must be also considered that each bowl 17 disposed radially is angularly adjustable in relation to the periphery of the sphere 17, while being secured rigidly in position against the thrust of the water stream by means of an abutting lever 40 cooperating with the port of the support arm 38 and secured on the opposite side by bolt 41 right ahead of the fastening point of the following bowl. With this arrangement, it is possible to adjust accurately each bowl 37 in a position of tangential rest and of possible fastening on the periphery of the sphere 17, as shown in FIG. 11.

As may be seen from FIG. 12, each bowl 37 is provided internally with a slide valve in the form of a flexible strip or band 41 secured at one of its ends and arranged in front of a bore 37[1] drilled in the thickness of said bowl at the bottom thereof. The strip or band 41, when the sphere 17 is driven in rotation, is thus caused by the pressure of the waterflow inside each receptacle forming bowl 37 to lie against the bore 37[1] and to seal said bore, and when the water is flowing out, there is produced through the bore 37[1] a direct air pressure action on the inside of said bowl 37 so as to push back internally said strip or band 41 while avoiding the successive suction and water lapping effect that would result in the braking of the sphere 17.

It will be noted that in the case of the addition of one or more additional bowl or blade rows in relation to the main row, all or some of the adjustable arms 38 disposed alternately and equipped with their bowls 37 or not permit respectively the fastening by bolts or the like of a transverse arm disposed slightly oblique in relation to the stationary shaft 19 and receiving the additional bowl. These arms form an adjustable framework by reason of the arms 38, as they are connected endwise and braced by adjustable rods of the cycle wheel spoke type forming a polygon circumscribed to the periphery of the sphere.

A fixed support ring 42 for the fastening of equidistant radial arms 43-44-45 to form the supporting framework of the electric generator assembly and of their speed multiplying devices cooperating with the toothed rim 18 is received within the sphere 17 by the stationary shaft 19, perpendicularly in accordance with the medial vertical plane of assembly of the hemispheres 17[1] and 17[2].

For this purpose, each arm 43-44-45 receives at the extreme end thereof a perforated bearing plate 46 for the adjustable fastening by nuts 47 and counter nuts 48 of screw threaded rods 49 controlled by a driving block 50 cooperating with the rim 18. Each V-shaped block 50 comprises a transverse spindle 51 on which there are keyed up, on the one hand, a central gear 52 meshing with the toothing 18[1] of the rim 18, and on the other hand, externally, two opposite wheels of large diameter 53 and 54 for driving two opposite and coaxially disposed alternators 56.

These alternators 56 or possibly any other electric generator are respectively supported by fastening rods associated with posts 57 secured to the reinforcing framework of arms 43-44-45 so that their driving gears 58 are in front of the wheels 53-54. The gear harnesses 52-53-54 et 58, and possibly further gears, form thus speed multiplying devices right ahead of an alternator pair 56 mounted along each arm so as to make possible the high speed rotation thereof. This arrangement, provided for all of the arms 43-44-45, permits the simultaneous drive of a plurality of generators, six in the example shown, that are interconnected by electrical wires connected to a terminal, the output leads of which pass through the hollow shaft 19.

It will be also noted that the arms 43-44 and 45 are rigidly interbraced according to a faultless balancing by a reinforcing framework comprised of braces 59 forming a triangulation in the plane of the toothed rim 18 and also, transversely, of bracing tubes 60 disposed obliquely for being fastened on the periphery of the hollow shaft 19.

According to a further embodiment illustrated in the FIGS. 15, 16, 17 and 18, the radial arms 43-44 and 45, respectively provided endwise with their abutting plate 46, make possible likewise the engagement and the fastening by nuts and counter nuts of screw threaded rods 49 associated with a base plate 61 forming a yoke for fastening for free rotation a roller 62 provided with an axial peripheral collar $62^1$ lined or not with a flexible tyre and mounted for free engagement within a medial groove $18^1$ of the rim 18. A faultless centering and guiding of the sphere 17 in relation to the hollow shaft 19 are possible with this arrangement, without any stress on the toothed rim 18. Furthermore, the roller 62 can be toothed on either side of its collar $62^1$ in substitution of the central gear 52 in the case of a driving block 50 forming a speed multiplying device, on account of the alternators 56.

It will be also noted that the framework formed by the arms 43–44 and 45 can only have guide rollers or tyres 62 cooperating with the medial groove $18^1$ of the rim 18, while a second framework, circularly staggered, can be provided in juxtaposition on said arms and have at its ends the gears meshing with the toothed rim 18 for driving alternators 56 or hydraulic pumps 64.

It will be evident that these frameworks associated with the stationary shaft 19 can be separately of any convenient shape. For instance, the framework formed by the supporting arms of rollers 62 can form the limbs of a star, while the framework supporting the driving gears can constitute a regular polygon, so as to position each gear between said rollers 62.

It will be also noted that the toothed rim 18 can be made with a T-shaped section disposed within the sphere 17, as illustrated in FIG. 19, the horizontal webs $18^2$ forming then raceways and guideways for the two opposite rollers 77, while the central toothed portion $18^1$ cooperates as stated above with the gear or gears 52 for providing the driving action. Said rim 18 can also have an external toothing on its webs.

Guiding by rollers 62 can also be disposed axially, along radial arms such as the arms 43 and 45 as in the example illustrated FIG. 15, while other arms, such as the arm 44, permit in the same way as in the preceding embodiment the mounting of a driving block 30 with central gear $52^1$ and one wheel or opposite wheels 53.

One of the wheels 54 cooperates here within a determined speed ration with the driving gear 63 of a hydraulic pump 64 fixed on an offset bearing-plate 65 transversely integral with the end of the corresponding arm 44. This pump 64 is made in a known manner and designed for handling a fluid under pressure through suitable hoses 66 and $66^1$ and for supplying this fluid to a corresponding hydraulic motor 67 located outside the generator assembly, for instance on the bank as mentioned hereafter.

It will be noted that it is possible to mount a plurality of hydraulic pumps disposed either in pair on each side of the arms or on some arms only, and staggered transversely for balancing the generator assembly.

Moreover, the radial arm 44 or other arms supporting a driving block 50 are respectively made integral with an adjacent rod that can be also formed by a second framework disposed in the same plane and having endwise the base plate forming a yoke 61 for receiving the roller 62. With this arrangement, as described previously, a full centering and the free rotation of the rim 18 are provided on all the arms integral or not with adjacent holding rods for a roller 62, irrespective of the drive by the gears.

It must be considered that the hoses 66–$66^1$ for inlet and return to the pump 64 are introduced within the sphere 17 through radial openings in the stationary shaft 19 for the sole purpose to be located within the hollow portion along the two ends.

These hoses 65 and 66 are connected to a hydraulic motor assembly disposed outside the generator assembly, for instance on a movable undercarriage brought on the bank, or possibly on a boat or other fixed point.

As an example only, and without being in any way limited to this example, such a pressure fed assembly comprises a valve 68, a tank 69, a filter 70, and the motor proper 67 with drive wheel 71. A rotating spindle 73 provided with pulleys 74 for the drive in rotation by belts 75 or the like of a plurality of electric generators 76 placed in line is driven by this drive wheel 71 through a mechanical transmission 72, these generators 76 being suitably connected to a distributing station or terminal.

It will be evident that besides the electric generators, any mechanical device, machine or apparatus as necessary, could be driven by the hydraulic motor forming thereby a power take-off.

According to a further embodiment, it is contemplated to provide the hollow sphere 17 with two rims 18 disposed symmetrically in relation to the larger diameter. These rims 18 are interconnected by a cylindrical or conical sleeve for the continuity of the opposed hemispheres.

This sleeve permits internally the location of an electric generator of large volume driven as in the previous instances by the toothed rims 18, and provided with a change speed transmission or gear with self-adjusted control or remote control.

Likewise, this sleeve can permit, in the case of hydraulic pump 64, the location of the fluid tank 69, preventing thereby an excessive admission leakage, or the location of any motor or pump for discharging on the bank the water from the river.

It will be noted also that the rim or rims can have or form circularly and internally peripheral cams for the mechanical drive in rotation of any known electric generator or motor with a possible cooling thereof, as the case may be, by a water circulation.

It will be noted further that the general arrangements can be inversed, with in this case a fixed shell and a blade driven rotary shaft.

As a whole, the generator forms a unit for easy transportation by means of a trailer, with yoke-shaped vertical arms for receiving and locking the protruding ends of the stationary shaft 19. For the placing in the water, said trailer, which will be a trailer with one axle only, can be easily brought in the watercourse to be thereafter tipped up vertically by means of its draft bar in order to make the sphere free for the immersion and buoyancy of the latter. The advantages are evident from the specification.

I claim:

1. Floating electric power generator using water energy in the form of a hollow volumetric body capable of floating or navigating in a natural or artificial watercourse and mounted for free rotation around a fixed horizontal shaft, the projecting ends of which are connected by means of moorings to a berthing station, while the periphery thereof includes blades for its rotational drive by the energy produced by the water stream, characterized in that said body forms a rotary shell permitting internally by reason of its volumetric hollow section the mounting of a plurality of electric generators disposed in a plane, each one of said generators being connected mechanically by its stator to the fixed shaft while the rotor is driven in rotation by the periphery of said shell by means of a driving device for the production of electric power by the assembly of said generators, characterized further in that the driving device of each generator is formed by a head mounted elastically at the end of a spindle that is returned elastically and associated with the rotor for abutting action on one of the faces of a flange connecting diametrally to the inside of the hollow section of the shell and bearing along the appropriate diameter in order to constitute a speed multiplying device, characterized further in that the stator of each generator is hingedly mounted on the stationary shaft for the adjustable angular pivoting thereof in relation to the flange so that the driving head is presented along a circle of varying diameter for varying the speed.

2. Electric generator according to claim 1, characterized in that the shell receives internally a circular rim the opposite faces of which are toothed for the meshing of heads mounted on the end of the sliding spindles returned elastically and associated with the rotors.

3. Electric generator according to claim 1, characterized in that the moorings are adjustable endwise to permit the shell to be adapted to the level of the water, characterized further in that the adjustable moorings are mounted elastically upstream by means of drums circularly returned by springs in order to be adapted to the level of the water.

4. Floating electric generator according to claim 3, characterized in that the protruding ends of the stationary shaft are coupled to lever arms disposed upstream to abut automatically with their free ends, when the hollow body is rotated, on a fixed point in order to permit said shaft to be secured against rotation by the moorings holding same; telescopic arms fixed on the shaft forwardly of the shell being coupled to a transverse bar connecting and coupling adjustably two moored floats spaced apart along the vertical axis of said shell and receiving axially vertical and adjustable vanes forming the admission device that constitutes a water neck-injector in front of the blades of the shell; blades in the form of bowls being disposed circularly and along one or more vertical rows on the periphery of the shell for the driving in rotation; vertical radial and symmetrical arms being mounted axially within the shell to permit endwise adjustable fastening of a block forming a speed multiplying device with a central gear meshing with the toothed rim; and lateral and opposite toothed wheels for driving two electric generators being disposed in pairs and cooperating with the speed multiplying device.

5. Generator according to claim 4, characterized in that the said radial arms permit endwise adjustable fastening of a roller holding support lined with a soft material to cooperate with a medial groove formed within the thickness of the toothed rim for the centering and positioning thereof without abutting stress on the toothing thereof.

6. Generator according to claim 5, characterized in that one of said radial arms receives endwise a speed multiplying block driven by the toothed rim, the output wheel of said block cooperating with the gearing of a hydraulic pump for the drive thereof, the fluid admission and discharge hoses of said pump passing through and within the stationary shaft in order to be connected externally to a hydraulic motor disposed outside said generator for driving another machine.

7. Generator as claimed in claim 6, characterized in that the rollers cooperating in pairs with the groove of the toothed rim are disposed respectively on an arm angularly associated with the said radial arm for driving a pair of alternators.

8. Generator according to claim 6, characterized in that the speed multiplying blocks are adjustably mounted in relation to the plates fixed at the end of the radial arms by means of screw threaded rods with nuts and counter nuts.

9. Electric generator according to claim 6, characterized in that the radial arms are interreinforced along their common plane by braces that form a triangulation, and transversely by bracing stays abutting on the stationary shaft.

10. Electric generator according to claim 6, characterized in that the hydraulic motor operated by means of the hoses connected to the hydraulic pump located within the shell is mounted on a mobile undercarriage and drives by means of its flywheel a rotary spindle connected by belts to a plurality of electric generators in line.

11. Electric generator as claimed in claim 10, characterized in that other apparatus is mechanically driven by the hydraulic motor.

12. Generator as claimed in claim 4, characterized in that the openings of the bar connecting transversely the floats, besides the fastening of the telescopic arms for holding down the fixed or stationary shaft, permit the engagement of vertical pins that constitute positioning and fastening pins for the opposite vertical vanes forming the water neck-injector disposed in front of the blades of the shell.

13. Generator according to claim 12, characterized in that the vertical vanes are angularly adjustable forwardly of the transverse bar while being interbraced and interlocked to constitute an axial and vertical triangulation forming the water neck-injector, the rear portions, inserted and disposed symmetrically and parallel in relation to the blades along the axis of the shell, forming in continuation of the water neck-injector a distributing chute or channel.

14. Generator according to claim 12, characterized in that each blade is comprised of reinforced plastics and is made axially integral with a squared arm linked to each collar of the half-portions of the shell, while a second rectilinear arm fixed endwise along the fastening point of the next blade forms an abutment while cooperating by its opposite end with a slot of the initial arm for adjusting in tangential position said blade on the periphery of the shell.

15. Generator according to claim 13, characterized in that each blade of any rounded or oblong section is provided along its convex part with a slide valve cooperating with an opening so as to seal the latter when the shell is driven in rotation, said slide valve being collapsed when the water is expelled by air pressure, in order to prevent the suction effect that would brake the rotation.

16. Generator according to claim 14, characterized in that there is an additional row of blades in relation to the main row, the adjustable fastening arms of said blades disposed alternately, permitting respectively the fastening of a transverse arm receiving the additional blade, said transverse arms being interconnected and interbraces endwise by means of thin adjustable rods that constitute a polygon circumscribed about the periphery of the hollowbody.

17. Electric generator according to claim 4, characterized in that the shell of the hollow buoyant body is made with at least two rimmed hemispheres disposed summetrically, connected by a rimmed sectional sleeve, allowing for the continuity and permitting internally the housing of plural electric generators and a hydraulic motor provided with its tank, driven by said rims with internal toothings.

18. Generator as claimed in claim 4, characterized in that the shell receives internally a pump actuated by the toothed rim, the admission piping of said pump drawing directly from the water along a side of the hollow stationary shaft, while the discharge piping opens along the opposite side to be guided to an external drinking water reservoir and irrigation system.

19. Electric generator as claimed in claim 4, characterized in that the shaft of the hollow body is provided with blades for the driving in rotation thereof and for the purpose of driving generators, while the shell is rendered stationary.

20. A floating electric power generator comprising:
a hollow buoyant ball adapted to float on the surface of a moving body of water;
an axle extending through said ball on an axis thereof, with the ends of said axle projecting beyond the surface of said ball;
bearing means connecting said axle to said ball whereby said ball may rotate about said axle;
said axle thereby defining a polar axis of rotation for said ball;
sealing means to insure watertightness of the joint between said axle and said ball during rotation of said ball about said axle;
means for mooring said ball, as it floats on the surface of said moving body of water;
said mooring means comprising a pair of upstream anchors, each connected by an individual cable to a respective one of said projecting ends of said axle;
said mooring means further comprising a pair of downstream anchors, each similarly connected by an individual cable to a respective one of said projecting ends of said axle;
whereby each projecting end of said axle is restrained from motion, both upstream and downstream, away from the respective anchors;
means connecting said cables to the respective projecting ends of said axle in such manner as to prevent free rotation of said axle with respect to the said cables;
a series of vanes mounted on said ball to constitute a paddle wheel for turning of said ball by said moving body of water, whereby said ball will rotate on said axle;
means within said ball, fixedly mounted on said axle, responsive to the rotation of said ball about said axle, to convert the energy of said rotation to electric energy;
transmission means to feed said electric energy through said axle to a utilization point;
the diameter of said ball, the weights involved and the scope of said cables being so related that the ball is held down by said cables in such degree as to float immersed with approximately one-third of its equitorial circumference immersed in said moving body of water and with approximately two-thirds of its equitorial circumference above said moving body of water;
whereby said ball, considered as a hull being towed upstream by the upstream anchors, exhibits moderate drag in comparison to the drag of said vanes when electric power is transmitted from said ball; and
whereby the combination of two upstream anchors and two downstream anchors prevents yawing of the ball in said moving body of water.

21. A floating electric power generator as in claim 20 comprising further;
means, responsive to breaking of said mooring means, to trigger the intervention of a safety switch to electrically disconnect said transmission means.

* * * * *